(12) United States Patent
Hashimoto et al.

(10) Patent No.: US 7,588,258 B2
(45) Date of Patent: Sep. 15, 2009

(54) STEERING APPARATUS

(75) Inventors: Masaaki Hashimoto, Toyota (JP);
Masahiko Hirose, Osaka (JP);
Yoshihide Ohara, Okazaki (JP);
Takahiro Tanaka, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/945,683

(22) Filed: Nov. 27, 2007

(65) Prior Publication Data
US 2008/0121457 A1 May 29, 2008

(30) Foreign Application Priority Data
Nov. 28, 2006 (JP) .............................. 2006-320480

(51) Int. Cl.
*B62D 3/12* (2006.01)
*B62D 5/06* (2006.01)
(52) U.S. Cl. ............................ 280/93.514; 280/93.515; 180/428; 180/444; 74/109; 74/422
(58) Field of Classification Search ............ 280/93.508, 280/93.51, 93.511, 93.514, 5.515, 93.515; 180/428, 437, 444; 74/388 PS, 422, 89.11, 74/109
See application file for complete search history.

(56) References Cited

U.S. PATENT DOCUMENTS

| | | | | |
|---|---|---|---|---|
| 4,479,400 A | * | 10/1984 | Rieger | .......................... 74/422 |
| 4,601,602 A | * | 7/1986 | Schnitzler | .................... 403/56 |
| 4,887,683 A | * | 12/1989 | Klosterhaus et al. | ........ 180/428 |
| 6,273,209 B1 | * | 8/2001 | Saito et al. | ................... 180/428 |
| 6,273,210 B1 | * | 8/2001 | Saito et al. | ................... 180/444 |
| 6,408,976 B1 | * | 6/2002 | Saito et al. | ................... 180/428 |
| 7,441,475 B2 | * | 10/2008 | Eberhart et al. | .......... 74/388 PS |
| 7,469,912 B2 | * | 12/2008 | Maruyama et al. | ..... 280/93.515 |
| 2005/0104314 A1 | * | 5/2005 | Maruyama et al. | ..... 280/93.515 |
| 2007/0039773 A1 | * | 2/2007 | Eberhart et al. | ............. 180/417 |

FOREIGN PATENT DOCUMENTS

JP 11-321694 11/1999

* cited by examiner

*Primary Examiner*—Ruth Ilan
(74) *Attorney, Agent, or Firm*—Oblon, Spivak, McClelland, Maier & Neustadt, P.C.

(57) ABSTRACT

A steering apparatus includes an attaching bracket connecting end portions of a pair of tie rods to a rack shaft. The attaching bracket includes a base which is fixed to the rack shaft and includes at least one fixing member inserting hole through which a fixing member fixing the attaching bracket to the rack shaft is provided, and a supporting stay supporting the end portions of the pair of tie rods via ball joints respectively. The supporting stay extends from an intermediate portion of the base in an axial direction of the rack shaft. A center of the ball joint supporting the end portion of each of the tie rods is positioned offset from an axial line of the fixing member by a predetermined distance when viewed along the axial direction of the rack shaft.

5 Claims, 4 Drawing Sheets

STEERING APPARATUS

CROSS REFERENCE TO RELATED APPLICATIONS

This application is based on and claims priority under 35 U.S.C. §119 with respect to Japanese Patent Application No. 2006-320480 filed on Nov. 28, 2006, the entire content of which is incorporated herein by reference.

FIELD OF THE INVENTION

The present invention relates to a steering apparatus.

BACKGROUND

Steering apparatuses include a center take-off type steering apparatus. According to known center take-off type steering apparatuses, a pair of tie rods operatively connected to wheels is attached to the central portion in a lateral direction of a vehicle body. For example, a steering mechanism includes a rack shaft and an elongated cylindrical rack housing which receives the rack shaft. A long bore is formed at an intermediate portion of the rack housing in the longitudinal direction. The rack shaft and the tie rods are connected via an attaching bracket respectively through the long bore (See JPH11-321694A and JP2001-151140A).

According to the construction described in JPH11-321694A, the attaching bracket is shaped in a rectangular form and is fixed to the rack shaft by means of bolts so that the longitudinal direction of the attaching bracket is in parallel to the rack shaft. The bolts penetrate through the attaching bracket vertically to the longitudinal direction of the attaching bracket. The tie rods are connected to end surfaces of the attaching bracket in the longitudinal direction via ball joints respectively.

According to the construction described in JP2001-151140A, the attaching bracket having a T-shape includes a base fixed to the rack shaft by means of bolts and a supporting stay which is extending, or protruding from the central portion of the base. The tie rods are connected to the supporting stay via ball joints respectively. The ball joints are arranged directly above head portions of the bolts.

Notwithstanding, according to the construction described in JPH11-321694A, because the bolts are arranged between the pair of ball joints in an axial direction of the rack shaft, a distance between the ball joints becomes longer and thus shortening the length of the tie rods. Consequently, steering stability and stability of the vehicle at high speed may decline.

In the meantime, according to the construction described in JP2001-151140A, because the bolts are provided between the ball joints and the rack shaft, the ball joints and the bolts may intervene in each other when shortening a distance between the ball joints and the rack shaft. In consequence, the steering apparatus per se is increased in size.

A need thus exists for a steering apparatus which is not susceptible to the drawback mentioned above.

SUMMARY OF THE INVENTION

In light of the foregoing, the present invention provides a steering apparatus, which converts a rotation movement of a pinion rotating cooperating with a steering member into a linear movement of a rack shaft extending in a right and left direction of a vehicle body, and on which a pair of tie rods for steering a pair of wheels in response to the linear movement is provided at a central position in the right and left direction of the vehicle body. The steering apparatus includes an attaching bracket connecting end portions of the pair of tie rods to the rack shaft. The attaching bracket includes a base which is fixed to the rack shaft and includes at least one fixing member inserting hole through which a fixing member fixing the attaching bracket to the rack shaft is provided, and a supporting stay supporting the end portions of the pair of tie rods via ball joints respectively. The supporting stay extends from an intermediate portion of the base in an axial direction of the rack shaft. A center of the ball joint supporting the end portion of each of the tie rods is positioned offset from an axial line of the fixing member by a predetermined distance when viewed along the axial direction of the rack shaft.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
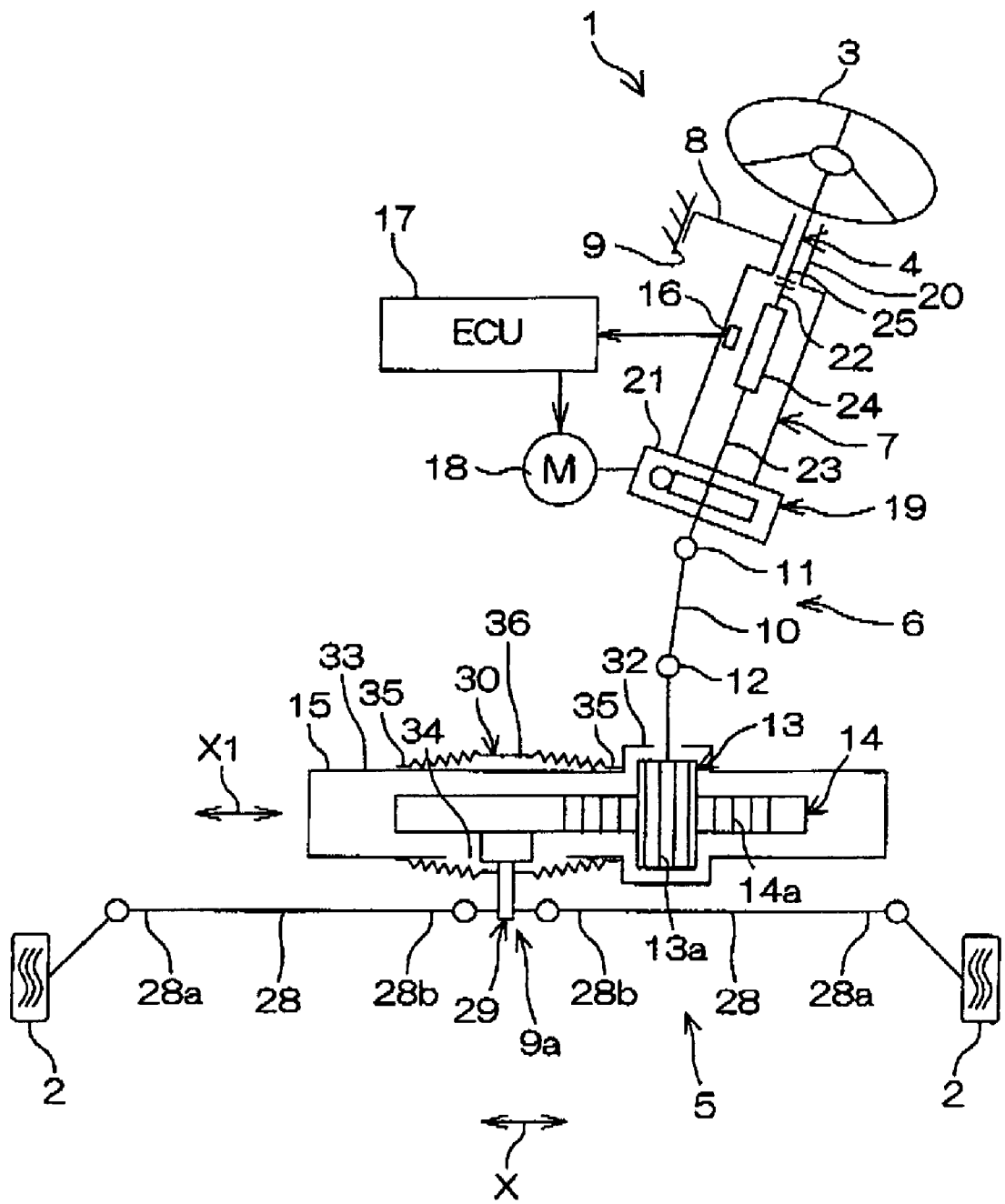
FIG. 1 is a schematic view of a steering apparatus according to an embodiment of the present invention.

One embodiment of the present invention will be explained with reference to illustrations of the drawing figures as follows. Although an electric powered steering apparatus is applied as a steering apparatus in the embodiment, types of the steering apparatus are not limited, and for example, a manual steering apparatus may be applied as the steering apparatus.

As shown in FIG. 1, a steering apparatus 1 includes a steering shaft 4 transmitting a steering torque applied to a steering wheel 3 serving as a steering member in order to steer wheels 2, a steering mechanism 5, for example, including a rack and pinion mechanism for steering the wheels 2 by the steering torque from the steering shaft 4, and an intermediate shaft 6 serving as a joint provided between the steering shaft 4 and the steering mechanism 5 for transmitting the rotation therebetween.

The steering shaft 4 is arranged through the inside of a steering column 7 so as to be rotatably supported by the steering column 7. The steering column 7 is supported by a vehicle body 9 via a bracket 8. The steering wheel 3 is connected to a first end of the steering shaft 4 so as to be rotatably supported. The intermediate shaft 6 is connected to a second end of the steering shaft 4.

The intermediate shaft 6 includes a power-transmitting shaft 10, a first universal joint 11 provided at a first end portion of the intermediate shaft 6, and a second universal joint 12 provided at a second end portion of the intermediate shaft 6.

The steering mechanism 5 includes a pinion 13 serving as an input shaft, a rack shaft 14 serving as a turning shaft extending in a direction X corresponding to right and left direction of the vehicle (i.e., a direction perpendicular to a straight driving direction of the vehicle), and a rack housing 15 supporting the pinion 13 and the rack shaft 14. Pinion gears 13a of the pinion 13 and rack gears 14a of the rack shaft 14 are meshed to one another.

The pinion 13 is rotatably supported by the rack housing 15. The rack shaft 14 is supported by the rack housing 15 so as to reciprocate. The rack housing 15 is fixed to the vehicle body 9. The rack shaft 14 is operatively connected to the wheels 2 via tie rods 28 and knuckle arms.

When the steering wheel 3 is steered, the steering torque is transmitted to the steering mechanism 5 via the steering shaft 4 and the intermediate shaft 6, and the rotation is converted into the straight movement of the rack shaft 14 along the direction X corresponding to the right and left direction of the vehicle by means of the pinion gears 13a and the rack gears 14a. Accordingly, the wheels 2 are steered.

The steering apparatus 1 is configured to attain steering assisting force in accordance with the level of the steering torque. Namely, the steering apparatus 1 includes a torque sensor 16 detecting a steering torque, an ECU (Electronic Control Unit) 17 serving as a controlling portion, an electric motor 18 for steering assisting, and a reduction gear 19 serving as a gear device. According to the embodiment, the electric motor 18 and the reduction gear 19 are provided in association with the steering column 7.

The steering column 7 includes a column tube 20 and a housing 21. The housing 21 houses and supports the torque sensor 16, supports the electric motor 18, and serves as a portion of the reduction gear 19.

The steering shaft 4 includes an input shaft 22, an output shaft 23, and a torsion bar 24, which serve as a bottom portion in an axial direction, and a connecting shaft 25 serving as a top portion in the axial direction. The input shaft 22 and the output shaft 23 aligned on the identical axial line are connected to each other via the torsion bar 24. The input shaft 22 is operatively connected to the steering wheel 3 via the connecting shaft 25. The output shaft 23 is operatively connected to the intermediate shaft 6. When the steering torque is inputted into the input shaft 22, the torsion bar 24 is elastically torsionally deformed, and thus the input shaft 22 and the output shaft 23 relatively rotate accordingly.

The torque sensor 16 is provided in association with the torsion bar 24 of the steering shaft 4 and detects a torque based on relative rotation displacement rate between the input shaft 22 and the output shaft 23 via the torsion bar 24. The detected torque is applied to the ECU 17.

The ECU 17 controls the electric motor 18 based on the detected torque and the detected vehicle speed detected by a vehicle speed sensor, or the like.

When the steering wheel 3 is operated, the steering torque is detected by the torque sensor 16, and the electric motor 18 generates the steering assisting force in accordance with the level of the detected torque and the detected vehicle speed, or the like. The steering assisting force is transmitted to the steering mechanism 5 via the reduction gear 19. In the meantime, the rotation of the steering wheel 3 is transmitted to the steering mechanism 5. In consequence, the wheels 2 are steered and the steering is assisted.

A center take-off type steering apparatus is applied as the steering apparatus 1 according to the embodiment. That is, a pair of tie rods 28 are provided at a central position 9a in the direction X of the vehicle body 9.

The steering mechanism 5 includes the pinion 13, the rack shaft 14, the rack housing 15, the pair of tie rods 28, a connecting portion 29 connecting the pair of tie rods 28 and the rack shaft 14, and a dust cover 30.

Each of the tie rods 28 is a bar shaped connecting member which receives the straight displacement movement of the rack shaft 14 and steers the wheels 2 in response to the straight displacement of the rack shaft 14. Each of the tie rods 28 connects the rack shaft 14 and the corresponding wheel 2. An outer end portion 28a of each of the tie rods 28 is connected to each of the wheels 2. An inner end 28b of each of the tie rods 28 is arranged at an approximately central position of the vehicle body 9 in the direction X of the right and left of the vehicle body 9 and is connected to an intermediate portion of the rack shaft 14 in an axial direction X1 of the rack shaft 14.

Figure 2:
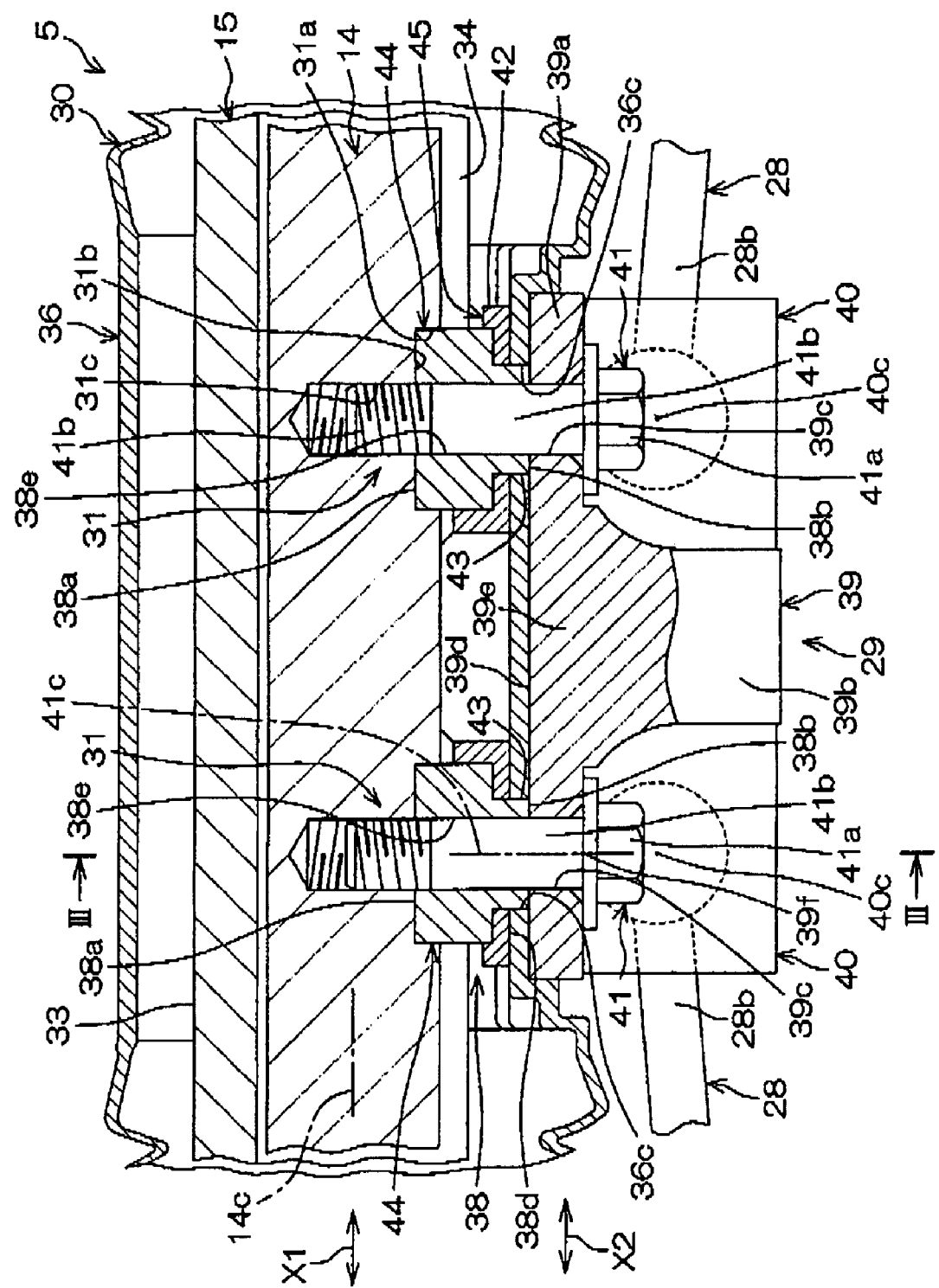
FIG. 2 is a partial cross-sectional view of a main portion of a steering mechanism of FIG. 1 and showing a cross-section taken on line II-II of FIG. 3.

As shown in FIGS. 1 and 2, the rack shaft 14 includes a pair of attaching portions 31 to attach the connecting portion 29 to the intermediate portion of the rack shaft 14 in the axial direction X1. Each of the attaching portions 31 includes a recessed portion 31a receiving and positioning a spacer 44 of the connecting portion 29, and a screw hole 31c formed at a bottom 31b of the recessed portion 31a. A fixing screw (i.e., serving as a fixing member) 41 is screwed into the screw hole 31c.

The rack housing 15 slidably supports the rack shaft 14 along the axial direction X1 of the rack shaft 14. The rack housing 15 includes a gear housing 32, which houses the pinion 13, and a cylindrical portion 33 adjacently arranged relative to the gear housing 32. A longitudinal direction of the cylindrical portion 33 (i.e., a longitudinal direction of the rack housing 15) is arranged to be in parallel to the axial direction X1 of the rack shaft 14. A first end of the cylindrical portion 33 is fixed to the gear housing 32. The cylindrical portion 33 houses the rack shaft 14 therein to support the rack shaft 14. A wide bore (long hole) 34 is formed on an intermediate portion of the cylindrical portion 33 in the longitudinal direction of the rack housing 15.

The wide bore 34 extends in the longitudinal direction of the rack housing 15. The connecting portion 29 is positioned through the wide bore 34. The wide bore 34 is configured in accordance with the moving range of the connecting portion 29 so that the connecting portion 29 moves in response to the displacement of the rack shaft 14 in the axial direction X1.

The dust cover 30 includes a cylindrical shape extending in one direction, and is made of rubber material or synthetic resin material serving as an elastic member so as to be retractable (stretchable) in a direction to where the dust cover 30 extends (i.e., longitudinal direction). The longitudinal direction of the dust cover 30 is arranged to be in parallel to the longitudinal direction of the rack housing 15. The dust cover 30 covers the wide bore 34 of the rack housing 15.

End portions 35, 35 of the dust cover 30 in the longitudinal direction of the dust cover 30 are fixed to the cylindrical portion 33 of the rack housing 15. A central portion 36 of the dust cover 30 in the longitudinal direction of the dust cover 30 is configured to move together with the connecting portion 29, and includes a pair of holes 36c, 36c which penetrate the dust cover 30. The holes 36c, 36c are provided to connect the respective tie rods 28 and the rack shaft 14. The fixing screw 41 and a slider 38 of the connecting portion 29 are positioned penetrating through each of the holes 36c.

Figure 3:
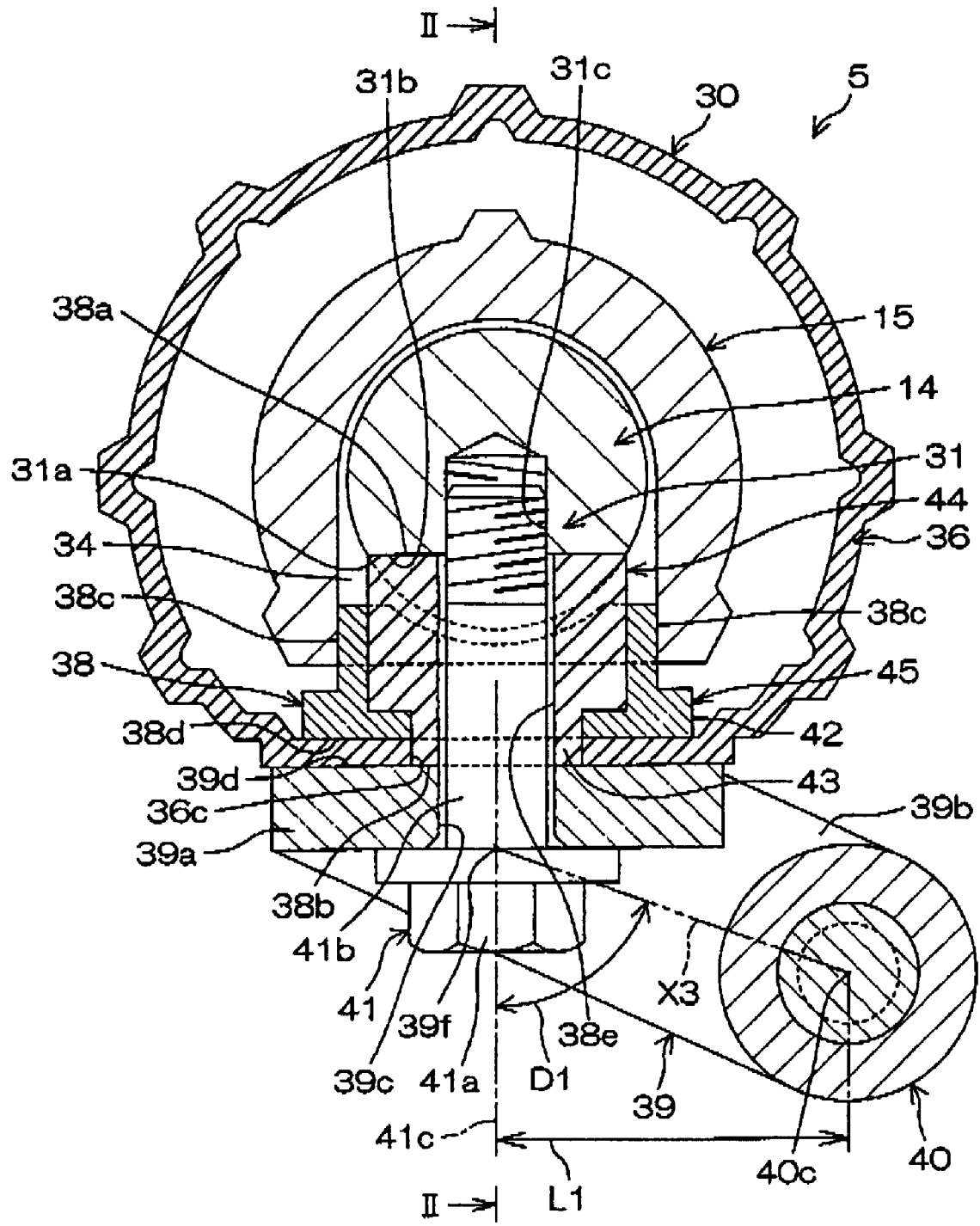
FIG. 3 is a partial cross-sectional view taken on line III-III of FIG. 2.

As shown in FIGS. 2 and 3, the connecting portion 29 includes the slider 38 which slides on an inner periphery of the wide bore 34 of the rack housing 15 while moving integrally with the rack shaft 14, an attaching bracket 39 for attaching the pair of tie rods 28 to the slider 38, ball joints 40 serving as a pair of joints which connect the attaching bracket 39 and the respective tie rods 28 so as to be freely movable to swing, and the plural (e.g., two) fixing screws (i.e., serving as a fixing member) which fix the attaching bracket 39 and the slider 38 to the rack shaft 14. The inner end 28b of each of the tie rods 28 is connected to the rack shaft 14 via the ball joint 40, the attaching bracket 39, and the slider 38.

The ball joint 40 includes a ball and a receiving member which has a recessed curve shape for receiving the ball. The ball includes a partially spherical configuration, and is fixed to the inner end 28b of the tie rod 28. The center of the partial sphere of the ball is a center 40c of the ball joint 40. The tie rod 28 is configured to be freely movable to swing around the center 40c. The receiving member includes a partial spherical surface. The receiving member is provided with a male screw for attaching the attaching bracket 39 thereto.

The attaching bracket 39 is provided to attach the inner end 28b of each of the tie rods 28, 28 to the rack shaft 14. The attaching bracket 39 includes a base 39a serving as a base portion which is arranged opposing to the slider 38, and a supporting stay 39b serving as an arm portion which protrudes from the base 39a. The base 39a and the supporting stay 39b are integrally formed with a single member.

The base 39a is an elongated plate shape member which extends in a direction X2 being in parallel to the axial direction X1 of the rack shaft 14. The base 39a includes a pair of screw inserting holes (i.e., serving as a fixing member inserting hole) 39c which penetrate through the base 39a. The fixing screw 41 is provided through each of the screw inserting holes 39c. The base 39a includes a facing portion 39d which faces the dust cover 30. At least a portion of the facing portion 39d is in contact with the dust cover 30.

The supporting stay 39b is extending from an intermediate portion of the base 39a in the axial direction X1 of the rack shaft 14, for example, from an intermediate portion 39e positioned between the pair of screw inserting holes 39c, 39c and extends in a direction being away from the rack shaft 14. The pair of ball joints 40 are connected to the supporting stay 39b, and the supporting stay 39b supports the inner ends 28b, 28b of the tie rods 28, 28 via respective ball joints 40, 40. Namely, the supporting stay 39b includes screw holes which extend in the axial direction X1 of the rack shaft 14. The male screw of the ball joints 40 is screwed into the screw hole.

Figure 4:
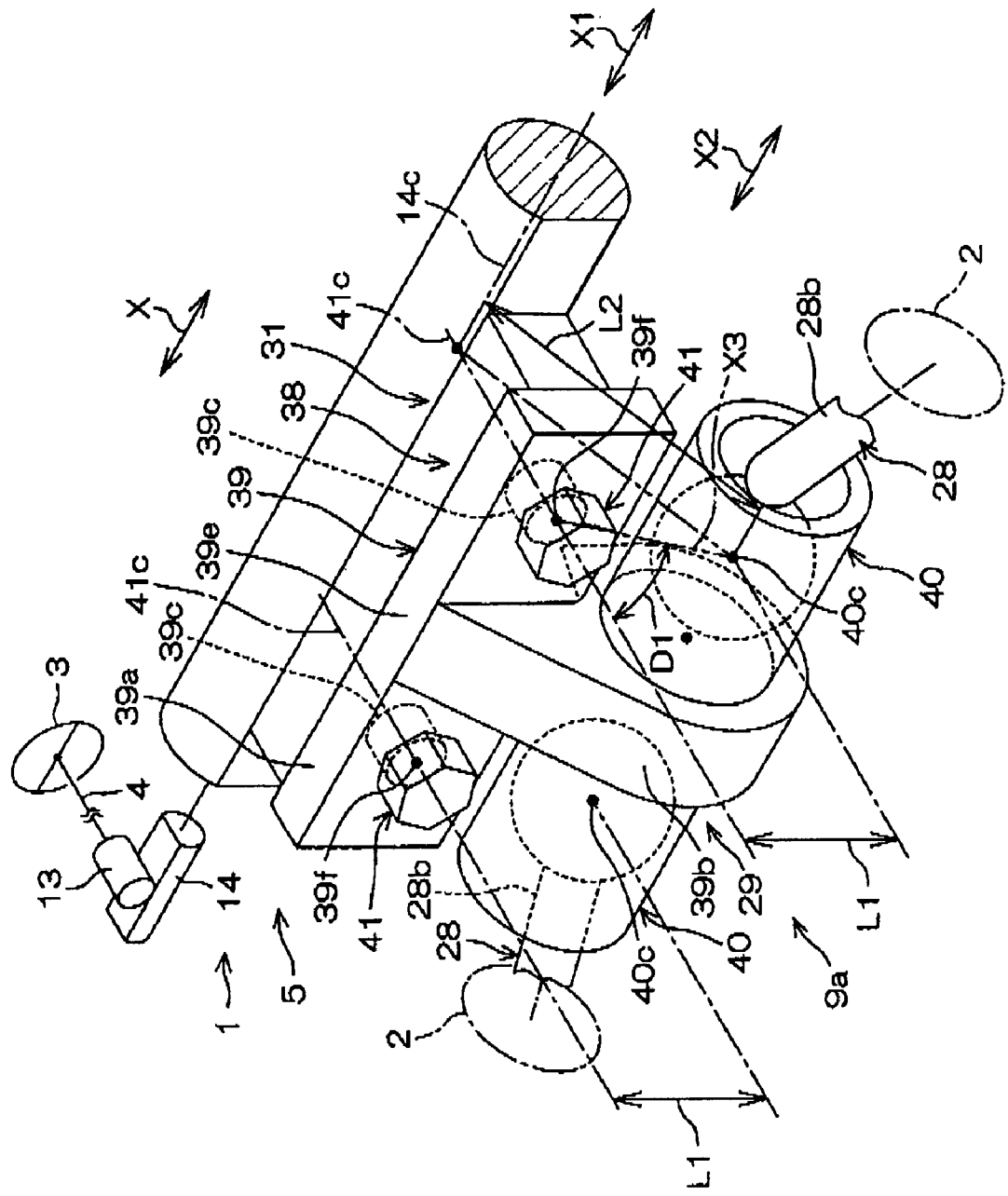
FIG. 4 is a schematic perspective view of a main portion of the steering mechanism shown in FIG. 1.

As shown in FIGS. 3 and 4, when viewed from or along the axial direction X1 of the rack shaft 14, the center 40c of each of the ball joints 40 is positioned being offset from an axial line 41c of the fixing screw 41 by a predetermined distance L1. The same predetermined distance L1 serving as an offset amount is applied to each of the ball joints 40. The centers 40c of each of the ball joints 40 are offset to the same side relative to an imaginary plane surface formed by connecting the axial line 41c of the fixing screw 41 and a central axial line 14c of the rack shaft 14.

When viewed from the axial direction of the fixing screw 41, the ball joints 40 and the fixing screws 41 are arranged not to overlap one another. When viewed from the axial direction of the fixing screw 41, the tie rods 28 and the fixing screws 41 are arranged not to overlap one another. This is advantageous to readily attach or detach the fixing screws 41. When viewed from the direction being vertical to the axial direction of the fixing screw 41 and being vertical to the axial direction X1 of the rack shaft 14 (See FIG. 2), the ball joints 40, the fixing screws 41 and the base 39a are arranged so that at least a portion of the ball joint 40 and at least a portion of the fixing screw overlap each other, and at least a portion of the ball joint 40 and at least a portion of the base 39a overlap each other.

When viewed from the direction being vertical to the axial direction X1 of the rack shaft 14, the supporting stay 39b extends in a direction vertically intersecting with the axial direction X1 of the rack shaft 14.

When viewed from the axial direction X1 of the rack shaft 14, the supporting stay 39b extends in a direction obliquely intersecting with the axial line 41c of the fixing screw 41 with an intersecting angle D1. In those circumstances, the intersecting angle D1 is defined as an angle which is formed by an imaginary line X3 connecting a center 39f of an outer opening of the screw inserting hole 39c and the center 40c of the ball joint 40 relative to the axial line 41c of the fixing screw 41 when viewed from the axial direction X1 of the rack shaft 14. For example, the intersecting angle D1 is set to have a value within a range of 30 degrees to 90 degrees. By setting the intersecting angle D1 within the range of 30 degrees to 90 degrees, a distance L2 between the rack shaft 14 and the ball joint 40 is securely shortened. The intersecting angle D1 may also be set to have a value other than the range of 30 degrees to 90 degrees.

The flying screw 41 is fixed to the rack shaft 14 with passing through the attaching bracket 39 and the slider 38. A bolt is applied as the fixing screw 41, which includes a head portion 41a and a shaft portion 41b on which a male screw is threaded. Although the central axial line 41c of the fixing screw 41 is arranged to vertically intersect with the central axial line 14c of the rack shaft 14 according to the above described embodiment, the arrangement of the central axial line 41c is not limited. For example, the central axial line 41c of the fixing screw 41 may be arranged obliquely intersecting with the central axial line 14c of the rack shaft 14, or may be arranged intersecting in parallel to the central axial line 14c of the rack shaft 14. The male screw of the shaft portion 41b of the fixing screw 41 is screwed into the screw hole 31c of the attaching portion 31 of the rack shaft 14. The attaching bracket 39 and the slider 38 are sandwiched between the head portion 41a of the fixing screw 41 and the bottom 31b of the recess portion 31a of the attaching portion 31 of the rack shaft 14.

As shown in FIGS. 2 and 3, the slider 38 is fixed to the attaching portion 31 of the rack shaft 14 so as to integrally move with the rack shaft 14. The slider 38 is provided between the attaching bracket 39 and the rack shaft 14 so as to connect the attaching bracket 39 and the rack shaft 14. The slider 38 supports the central portion 36 of the dust cover 30 so as to integrally move together.

The slider 38 includes a first connecting portion 38a which is fixedly connected to the rack shaft 14, a second connecting portion which is fixedly connected to the attaching bracket 39, a slide contacting portion 38c which is slidably fitted to an inner periphery of the wide bore 34 of the rack housing 15, a holding portion 38d arranged facing the attaching bracket 39 and holding the dust cover 30 in a state being sandwiched between the attaching bracket 39 and the slider 38, and an inserting hole 38e through which the fixing screw 41 is provided.

The slider 38 includes a main body portion 42 and protruding portions (e.g., two protruding portions) 43, 43. The protruding portions 43 are formed in the identical configurations. The main body portion 42 is arranged closer to the rack shaft 14 than the holding portion 38d. The main portion 42 includes the first connecting portion 38a, the slide contacting portion 38c, and the holding portion 38d. The protruding portion 43 is formed by a portion provided at a tip end side relative to the holding portion 38d at the slider 38, and protrudes from the main portion 42 in a direction vertically intersecting with the axial direction X1 of the rack shaft 14. The protruding portion 43 includes the second connecting portion 38b. The inserting hole 38e is formed penetrating through the main portion 42 and the protruding portion 43.

Particularly, the slider 38 includes a pair of cylindrical spacers 44 and a connecting member 45 which connects the pair of spacers 44, 44 each other. The pair of spacers 44 and the connecting member 45 formed as separate members are combined to form the slider 38.

As shown in FIG. 4, the steering apparatus 1 according to the embodiment is a center take-off type steering apparatus in which a pair of tie rods 28 are attached at the central position 9a of the vehicle body 9 in the right and left direction X, which converts a rotational movement of the pinion 13 rotating cooperating with the steering wheel (i.e., serving as the steering member) 3 into a linear movement of the rack shaft 14 which extends in the right and left direction X of the vehicle body 9, and which steers the pair of wheels 2 in response to the linear movement. The steering apparatus 1 includes the attaching bracket 39 for attaching the inner ends 28b serving as end portions of the pair of tie rods 28 to the rack shaft 14. The attaching bracket 39 includes the base 39a and the supporting stay 39b. The base 39a, extending in the direction X2 being in parallel to the axial direction X1 of the rack shaft 14, includes the pair of screw inserting holes 39c through which the fixing screw 41 which fixes the attaching bracket 39 to the rack shaft 14 is inserted. The supporting stay 39b is formed extending or protruding from the intermediate portion 39e between the pair of screw inserting holes 39c in the direction X2 which is parallel to the axial direction X1 of the rack shaft 14 and supports the inner ends 28b of the pair of tie rods 28 via the respective ball joints 40. Viewed from along the axial direction X1 of the rack shaft 14, the center 40c of the ball joint 40 which supports the inner ends 28b of each of the tie rods 28 is positioned offset from the axial line 41c of the fixing screw 41 by the predetermined distance L1.

According to the embodiment, for example, the distance L2 between the center 40c of the ball joint 40 and the rack shaft 14 is shortened without interfering the respective ball joints 40 (or inner ends 28b of the tie rods 28) and the fixing screws 41. Accordingly, the steering apparatus 1 is downsized in the direction being perpendicular to the axial direction X1 of the rack shaft 14.

Because the interference between the ball joints 40 and the fixing screws 41 is prevented, a layout of the ball joint 40 is not restricted by the interference between the ball joints 40 and the fixing screws 41. In consequence, shortening the distance between the ball joints 40, 40 enables to elongate the length of the tie rods 28. By increasing the length of the tie rods 28, changes in a static toe angle at a tire stroke, that is, changes in a static toe angle when the wheels 2 move upward and downward is reduced, and thus improving the steering stability and the high speed stability of the vehicle.

Further, because the interference between the ball joints 40 and the fixing screw 41 is prevented, a layout of the fixing screw 41 is not restricted by the interference between the ball joint 40 and the fixing screw 41. Consequently, a distance between the fixing screws 41, 41 is shortened, which contributes to downsize the steering apparatus 1. Further, space for housing a large screw with high rigidity as the fixing screw 41 is ensured.

By changing the attaching brackets 39 having different predetermined lengths L1, the relative positional relationship between the rack shaft 14 and the ball joint 40 is changeable. Consequently, for example, portions of the steering mechanism 5 other than the attaching bracket 39, for example, the rack shaft 14 may be commonly applied to steering apparatuses 1 for plural different types of vehicles which have different relative positional relationship between the rack shaft 14 and the ball joint 40.

Although an electric motor is applied as a driving source for attaining a steering assisting force in the steering apparatus 1 according to the foregoing embodiment, a hydraulic power cylinder serving as a hydraulic actuator may also be applied as the driving source for obtaining the steering assisting force. Further, the driving source for obtaining the steering assisting force may be provided at the rack housing 15 instead of the steering column 7. Various design changes may also be made according to the subject matter of the steering apparatus.

According to the embodiment of the present invention, the center take-off type steering apparatus 1, which converts the rotation of the pinion 13 rotating cooperating with the steering member 3 into the linear movement of the rack shaft 14 extending in the right and left direction X of the vehicle body 9, and on which the pair of tie rods 28 for steering the pair of wheels 2 in response to the linear movement are provided at the central position 9a of the right and left direction of the vehicle body 9, includes the attaching bracket 39 which attaches the end portions 28b of the tie rods 28 to the rack shaft 14. The attaching bracket 39 includes the base 39a which is provided with the pair of screw inserting holes 39c through which the fixing screw 41 for fixing the attaching bracket 39 to the rack shaft 14, and the supporting stay 39b which is formed extending from the intermediate portion 39e between the pair of screw inserting holes 39c and supports the end portions 28b of the pair of tie rods 28 via the ball joints 40 respectively. When viewed along the axial direction X1 of the rack shaft 14, the center 40c of the ball joint 40 which supports the end portion 28b of each of the tie rods 28 is positioned offset from the axial line 41c of the fixing screw 41 by the predetermined distance L1.

According to the embodiment of the present invention, a distance between the center 40c of the ball joint 40 and the rack shaft 14 is shortened without interfering, for example, the ball joints 40 (or end portions 28b of the tie rods 28) and the fixing screws 41. Accordingly, the steering apparatus 1 is downsized in the direction perpendicular to the axial direction X1 of the rack shaft 14. Because the ball joint 40 and the fixing screw 41 are prevented from being interfered each other, the layout of the ball joint 40 is not restricted by the interference between the ball joint 40 and the fixing screw 41. Consequently, the distance between the ball joints 40, 40 is shortened, thus allowing the tie rods 28 to be elongated. By increasing the length of the tie rods 28, changes in a static toe angle at the tire stroke is reduced, which improves the steering stability and the high speed stability of the vehicle. Because the ball joint 40 and the fixing screw 41 are prevented from being interfered each other, the layout of the fixing screw 41 is not restricted by the interference between the ball joint 40 and the fixing screw 41. Consequently, the distance between the fixing screws 41 is shortened, and thus contributing to downsize the steering apparatus 1 per se.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

We claim:

1. A steering apparatus, which converts a rotation movement of a pinion rotating cooperating with a steering member into a linear movement of a rack shaft extending in a right and left direction of a vehicle body, and on which a pair of tie rods for steering a pair of wheels in response to the linear movement is provided at a central position in the right and left direction of the vehicle body, comprising:

an attaching bracket connecting end portions of the pair of tie rods to the rack shaft;

the attaching bracket including:

a base which is fixed to the rack shaft and includes at least one fixing member inserting hole through which a fixing member fixing the attaching bracket to the rack shaft is provided; and a supporting stay supporting the end portions of the pair of tie rods via ball joints respectively, the supporting stay extending from an intermediate portion of the base in an axial direction of the rack shaft;

wherein a center of the ball joint supporting the end portion of each of the tie rods is positioned offset from an axial line of the longitudinal axis of the fixing member by a predetermined distance when viewed from the axial direction of the length of the rack shaft, wherein when viewed from a direction vertical to an axial direction of the fixing member and vertical to the axial direction of the rack shaft, each of the ball joints and the fixing member are arranged so that at least a portion of the ball joint and at least a portion of the fixing member overlap each other.

2. The steering apparatus according to claim 1, wherein the base includes two fixing member inserting holes, and the supporting stay extends from the base at an intermediate portion between the fixing member inserting holes.

3. The steering apparatus according to claim 1, wherein when viewed from an axial direction of the fixing member, each of the ball joints and the fixing member do not overlap with each other.

4. The steering apparatus according to claim 1, wherein an imaginary line connecting a center of the fixing member inserting hole and the center of each of the ball joints is determined to have 30 to 90 degrees relative to the axial line of the fixing member.

5. The steering apparatus according to claim 1, wherein the fixing member is arranged so that the axial line of the fixing member vertically intersects with an axial line of the rack shaft.

* * * * *